DREDGING LOADER

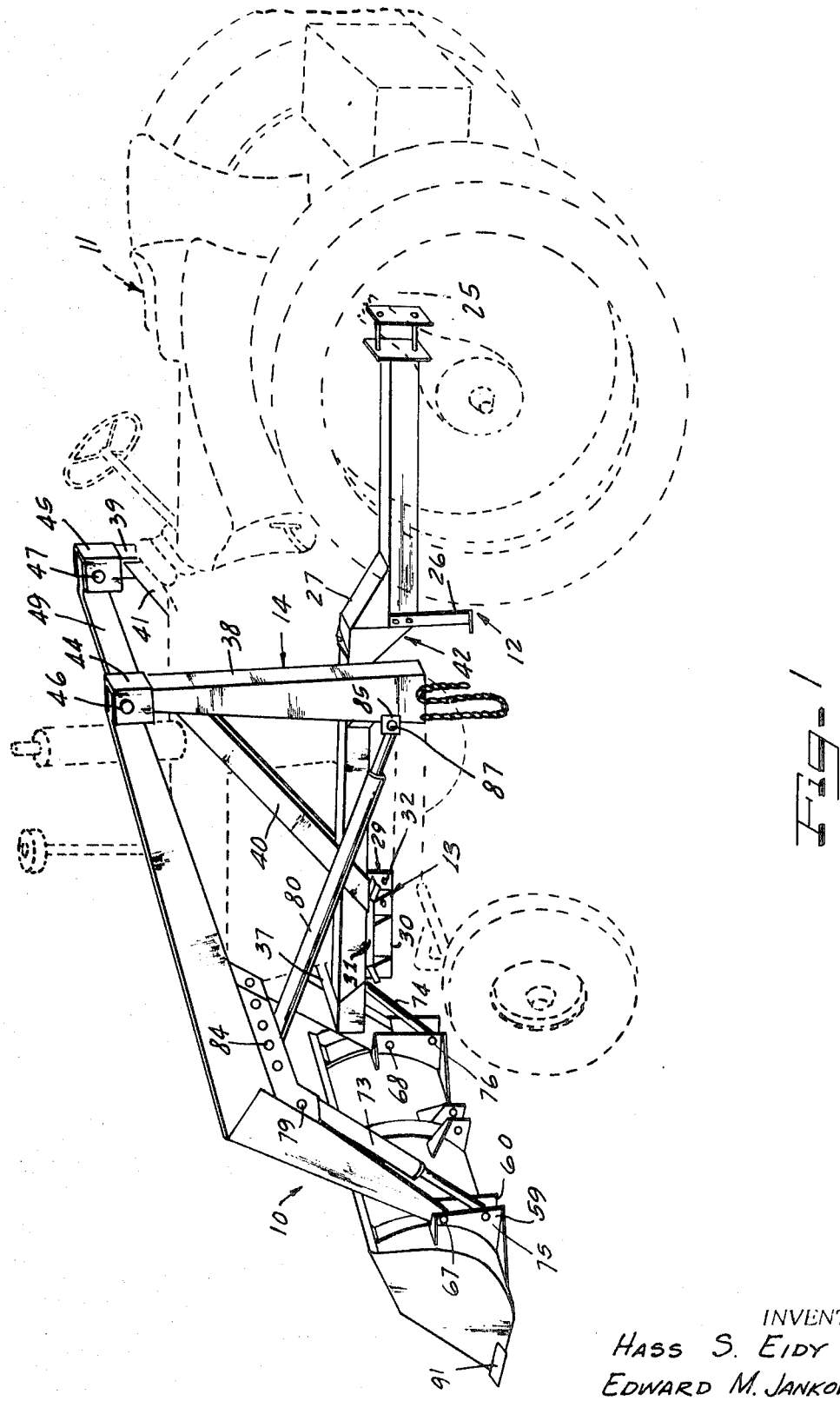

BACKGROUND OF THE INVENTION

This invention relates to a dredger-loader consisting of an at least two-axle vehicle, an earth-moving device such as a loading shovel or grading device articulated on the front of the vehicle, and a dredger swingably positioned on the rear of the vehicle.

Almost all construction sites require digging and loading or grading work within short intervals of time; in order to make full use of the equipment or in order to keep the number of vehicles required to a small number, it is known that ditchers can be attached on the tail end of conventional front loaders. In the case of the front loader, the drive motor, including the driving gears, distributor gears, and hydraulic pumps are customarily arranged in a manner protruding backward, above the rear axle which is arranged like a pendulum. In the case of the additional attachment of a ditcher, there occurs a very unfavorable weight distribution. In order to prevent the vehicle from tipping over during the transportation of the excavator, it is therefore absolutely necessary to lock the jointed swinging axle. A further disadvantage in such equipment, which is made for multipurpose use, consists in the fact that the accessory dredger has a swing radius limited only to about 180° and that no counterweight is available in case of excavating work that runs lateral with respect to the direction of movement or driving. Therefore, the scraping forces may then be employed only to a limited extent. In addition to this, it is extremely awkward for the operator to change his position from his driver and front loader operator seat, over the engine, to the excavator seat, especially in the case of ditch digging, when the vehicle must again and again be driven forward for a small distance after a shorter excavating period.

On the other hand, there are tractors which are converted from farm tractors and which are equipped with a loading scoop that is arranged swingably over the front axle and on whose tail end ditchers can be attached. In this design, poorer loading and grading properties are obtained than in a vehicle specially designed for this purpose because of the fact that the loading scoop or shovel is arranged above the forward control or guidance jointed swinging axle. Since these carrier vehicles, in themselves, are built in the form of traction vehicles, there is usually only provided a single-axle drive with oversized rear driving wheels and small front wheels. This gives poor ground pressure distribution. In this design, furthermore—if it is equipped with an accessory attachable dredger—there is also the above-described disadvantages of a limited dredger swing range, of the absence of a counterweight when excavating must be done laterally with respect to the direction of drive, and of the impractical changing of seats from one operating position to the next.

SUMMARY OF THE INVENTION

The invention is based on the task of further developing a dredging loader avoiding the described disadvantages, to such an extent that optimum conditions will be available in regard to the bracing and absorption of working forces and weight distribution both for the use of the loading shovel and for the use of the ditcher. Also, obtaining the swingability, as well as force utilization which will remain fully equal over the entire swing range, will become possible particularly when using the dredger or excavator tool. This is intended simultaneously to achieve considerable simplification of the function requiring the operator to change seats from one position to another or to eliminate this seat-changing altogether. To solve this problem, it is proposed, according to the invention, for the multipurpose equipment of the design described in the beginning, that the vehicle motor, including the gears and the hydraulic equipment, be arranged above the front axle and that the frame of the excavator, provided with a counterweight, be arranged approximately above the rear axle. The operating positions for the excavator and the front loader are arranged on a baseplate attached to the vehicle above the rotatable excavator frame or chassis. This gives an excavator-loader with full utilization possibility both for the loading shovel and for the ditcher, without any need for possibly be hampered in this fashion.

An improved equalization or balance with respect to the forces, because of the excavator shovel at a great distance from the center of gravity of the vehicle, is given by the fact that the vehicle motor and the other drive elements are located above the front axle. The inclusion of the excavator in the structure of the vehicle and the equipment of the excavator with a necessarily protruding counterweight turn out to be advantageous for the purpose of combining the driver's position. For the excavator and front loader, one can use a single swing-seat which not only makes it unnecessary to have the driver change seats but which, at the same time, improves the visibility during excavating work. The inclusion of the excavator in the structure of the vehicle accordingly offers favorable arrangement possibilities for the driver's position and the excavator operating position, in such a way that the changing of seats from one seat to the other seat can be eliminated altogether.

A practical further development of the invention consists in arranging the motor on the front of the vehicle and the excavator, with a turntable, on the rear of a vehicle designed in the form of an articulated chassis in which the perpendicular turning axis lies in the middle between the front and the rear axle. In articulated chassis vehicles this gives the advantage of a smaller turning circle for the vehicle and good maneuverability in a very small space.

The driver's positions can be arranged on a baseplate connected with the vehicle, the baseplate covering the rotatable chassis of the excavator and which rests on a central supporting bearing. This proposal likewise offers the possibility of combining the driver's position and the excavator operating position so that the forward-facing control panel or dashboard for the operation of the excavator can be operated from a swing-seat which can be rotated by 180°. The excavator control panel, according to another version, can be swung along, above the baseplate, together with the seat and with the excavator chassis.

BRIEF DESCRIPTION OF THE DRAWINGS

The invention is explained in detail below, together with accompanying examples illustrated in the Figures.

FIG. 1 shows a cross section of an excavator-loader according to the invention, designed as an articulated-chassis vehicle.

FIG. 2 shows a top view of the same piece of equipment.

FIG. 3 is another version, in the same illustration as in FIG. 1.

DESCRIPTION OF THE PREFERRED EMBODIMENTS

The vehicle, which is designed as an articulated-chassis vehicle in the example according to FIGS. 1 and 2, consists of a forward vehicle portion 2 and a rearward position 3 which are flexible and controllably connected with each other via a bending axis 6 which is arranged exactly in the middle between the front axle 4 and the rear axle 5. The forward position includes the drive motor with the driving gears, distributor gears, and hydraulic pumps for various working tools provided on the vehicle. The front axle 4 is constructed in the form of the noncontrollable rigid axle, while the likewise powered and noncontrollable rear driving axle 5 is positioned, in pendulum fashion on rear position 3, in a universal joint bearing 7, schematically indicated at point 7.

A loading shovel, schematically indicated at 8, is attached to the front portion 2 in a manner customary in front loaders. This front loader has good grading and loading properties by virtue of rigid axle 4 and weight stressing due to the motor and the gears, as well as the fuel and hydraulic fluid tanks located on the front portion. Approximately above the rear jointed swinging axle 5 there is arranged, on a chassis 9 of the rear portion 3 a turntable mount 10 which supports an excavator

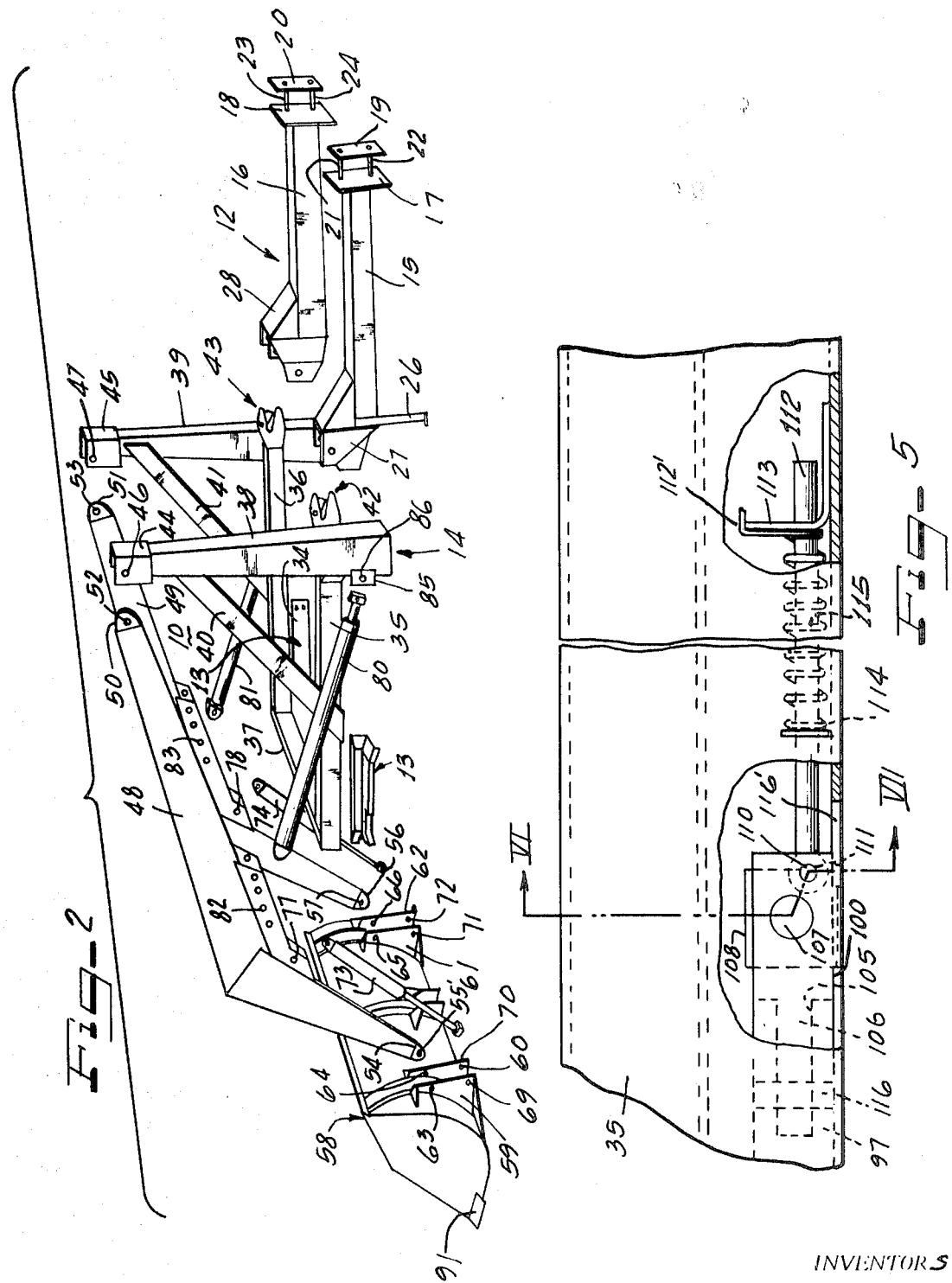

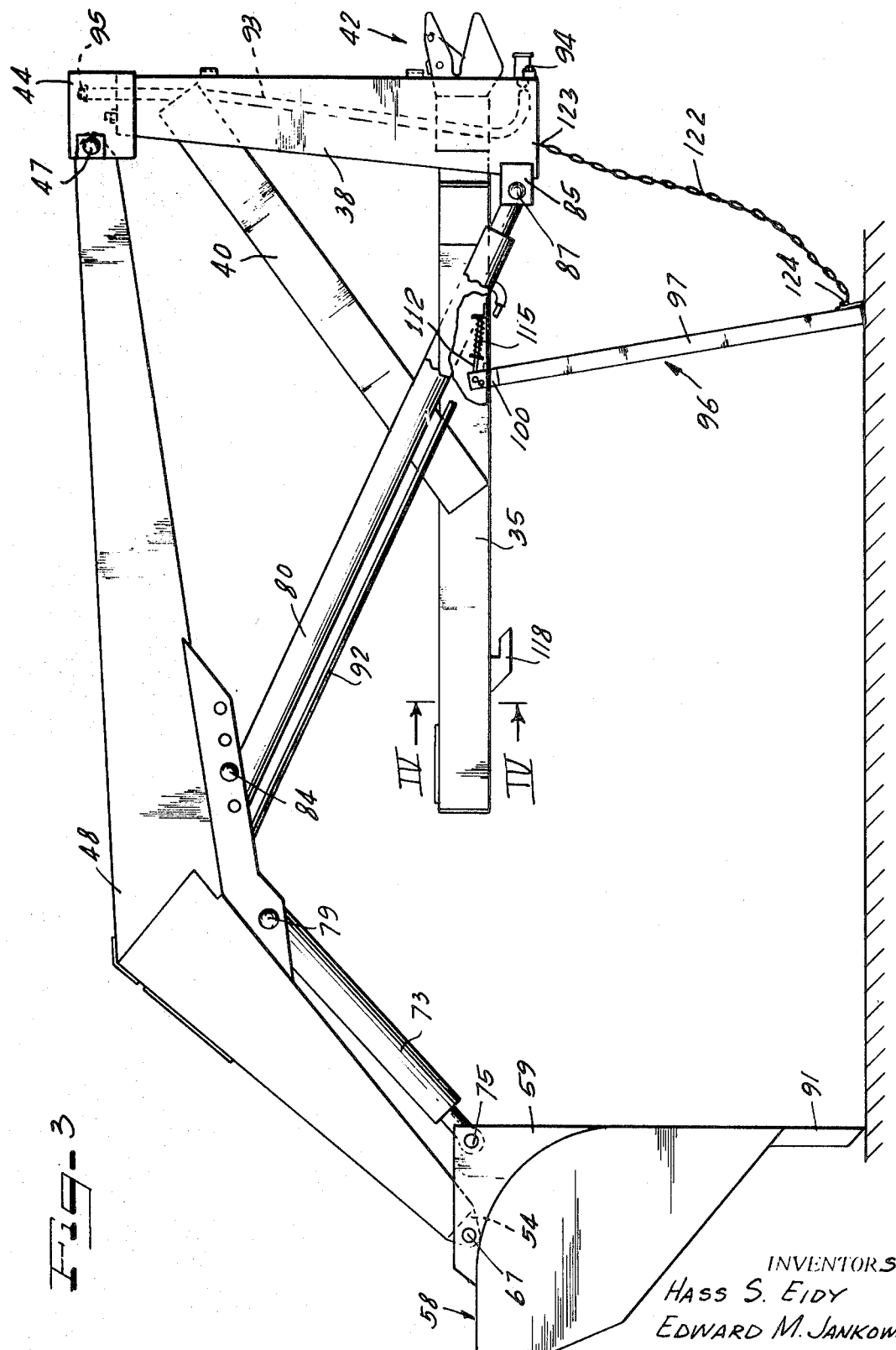

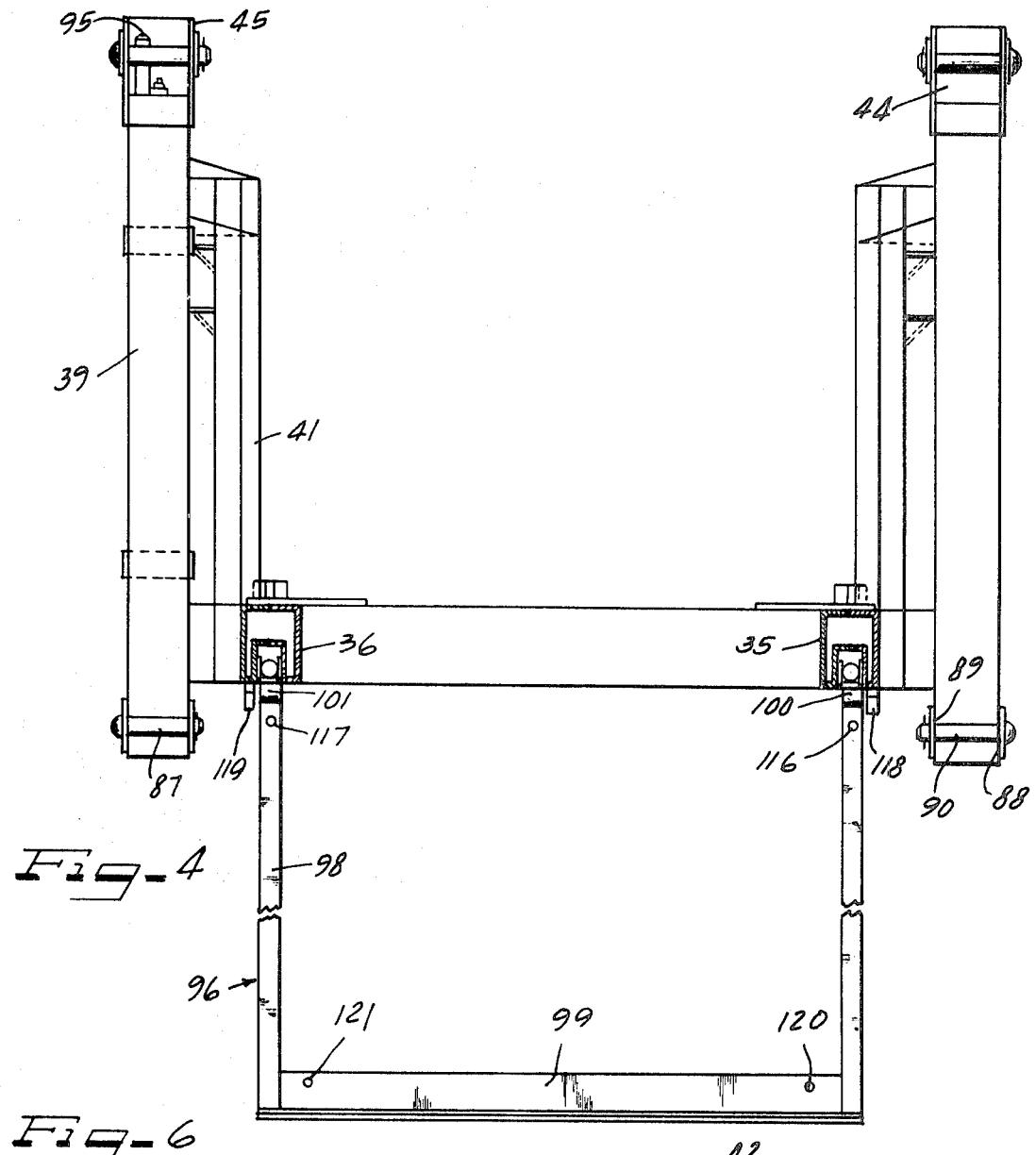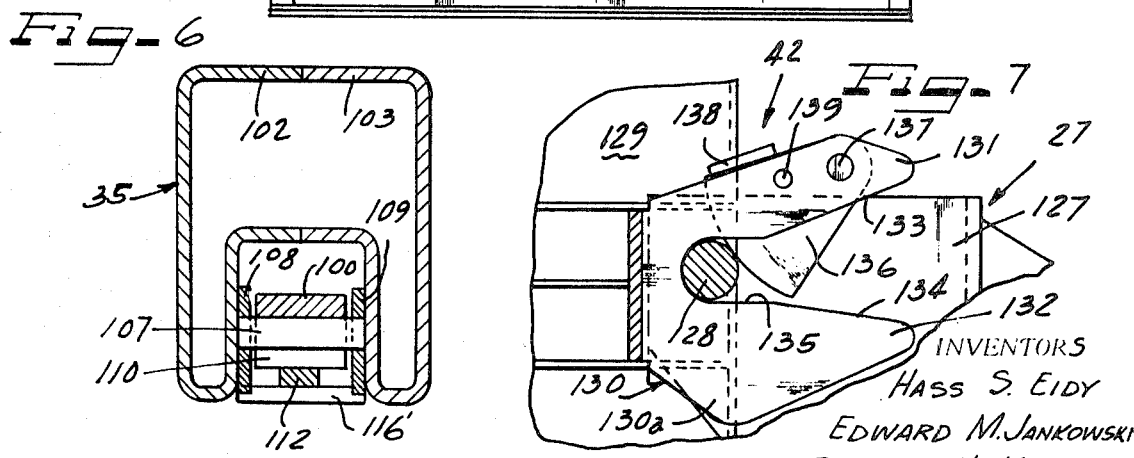

TRACTOR LOADER

BACKGROUND OF THE INVENTION

1. Field of the Invention

This invention relates to loader apparatus for mounting on tractors and is particularly concerned with quick attachment type loaders which are self-supporting when detached from a tractor.

2. Description of the Prior Art

Heretofore, tractor loaders were usually mounted on the tractor by means requiring time-consuming removal each time the tractor was required for service other than loading. In addition, in order to properly align the loader with the tractor it was necessary to support the loader on boxes and barrels in somewhat of an unsteady and definitely unsafe position, particularly when the loader was to be detached and stored over a period of time. In another form a loader apparatus is provided with a stand which releasably engages the loading implement, such as a bucket or fork, and on which the remainder of the loader apparatus is permitted to rest. This arrangement of course has the disadvantage that the loader must be provided with a separate supporting stand and accordingly, the loader apparatus must be either transported to the same location for storage or the stand must be moved to desired storage locations.

Another device for self-supporting loader apparatus resided in the provision of the frame of the apparatus as both the supporting structure when mounted on the tractor and as a supporting stand when detached from the tractor. In these prior loaders such as shown for example in U.S. Pat. No. 3,324,954, the main frame is manipulated from a horizontal working position on the tractor to an inclined ground-engaging position, and vice versa, as the tractor moves relative the frame by means of the operative extension and contraction of the hydraulic rams which are normally used for operating the implement and its supporting boom structure. This type of self-supporting implement apparatus also has the disadvantages that it is necessary for the hydraulic pistons to be extended for undetermined lengths of time wherein the pistons are adversely exposed to the elements and are subject to corrosion and pitting, and wherein unnecessary wear of the hydraulic units is effected by requiring the use of hydraulic pressures of the units for mounting, storage and dismounting of the apparatus. Another serious disadvantage is that the hydraulic hoses which run from the pump on the tractor, must remain connected until the tractor is backed away from the loader. This is because the support must be power tilted into support position. The present structure avoids tilting the support and the hoses can be disconnected before the tractor is backed out of the loader. This permits the use of substantially shorter hoses. It is therefore highly desirable, and a primary object of the present invention, to provide a loader device wherein the frame or support remains horizontal during parking on a separate stand is used, and in which the stand supports the loader in substantial alignment for receiving an associated tractor, and in which mounting and dismounting of the loader is automatically achieved by movement of the tractor and without the aid of powering devices, such as hydraulic units and short hydraulic hoses can be employed.

It is a further object of the present invention to provide a self-supported loader in which the supporting members provide a stable supported structure and in which safety devices are provided to maintain stability of the supporting members upon receipt of an inadvertent bump when in a freestanding condition.

SUMMARY OF THE INVENTION

Briefly, according to the invention, there is provided an implement-mounting apparatus for quick attachment and detachment of a working implement to a tractor in the form of a generally U-shaped frame structure having a pair of spaced-apart legs defining a channel for entry and exit of a tractor. The spaced-apart legs of the U-shaped frame each carry an upstanding post rigidly connected thereto, the free ends of the upstanding post being pivotally connected to a boom structure having a working implement connected to the distal end thereof. At the rearwardly extending end of each of the spaced-apart legs is provided a latch mechanism which is cooperable with a mating latch mechanism on a corresponding subframe structure carried by the associated tractor for releasably connecting the frame to the tractor as the tractor moves through the channel.

A pair of spaced-apart stand legs having a transverse member connecting the ground-engaging ends thereof are pivotally connected to corresponding ones of the spaced-apart legs of the U-shaped frame and are cooperable in their ground-engaging position with the implement in its ground-engaging position to support the apparatus upon exit of the tractor from the channel.

A spring-loaded toggle mechanism is provided in each of the spaced-apart legs of the U-shaped frame and is operatively connected to the corresponding stand legs to force the stand legs rearwardly of a vertical dependency position to add stability to the self-supporting characteristic of the apparatus by placing the weight of the frame structure in a downwardly directed position to the rear of the pivot points of the stand a leg stop preventing further rearward pivoting, the remaining weight being directed downwardly through the implement.

A slide device is secured to each side of a tractor to slidably engage the underside and sidewardly engage the corresponding spaced-apart legs of the U-shaped frame as the tractor moves relative thereto and to pivot the stand legs out of the ground-engaging position and forwardly to a storage position within a hollow channel in each of the corresponding frame legs. On entry and exit of a tractor the slide devices engage downwardly directed members of the rear latch mechanism to pivotally lift the U-shaped frame so that the stand legs may be pivoted between its two positions without interference with the ground.

BRIEF DESCRIPTION OF THE DRAWINGS

The foregoing and other objects, features and advantages of the invention, its organization, construction and operation will become apparent from the following detailed description of a single exemplary embodiment thereof taken in conjunction with the accompanying drawings, in which:

FIG. 1 is a pictorial elevational view of a tractor loader according to the present invention shown mounted to a tractor which is indicated in phantom;

FIG. 2 is an exploded view of the tractor loader according to the present invention showing the major components of the loader as they appear in a substantially tractor-mounted condition;

FIG. 3 is an elevational view of a loader device shown in a self-supporting condition in accordance with the principles of the present invention;

FIG. 4 is a front elevational view of the apparatus illustrated in FIG. 3 with the implement, the boom and boom-operating apparatus removed and taken in section along the line IV—IV of FIG. 3 particularly illustrating the pivotal connection and disposition of the stand legs with respect to the frame;

FIG. 5, shown on the same sheet as FIG. 2, is a fragmentary view of one of the legs of the frame structure shown partially broken away in the area of the pivotal connection of the stand legs to the frame and particularly illustrating the toggle mechanism for forcing the leg beyond a vertical position upon exit of the tractor from the frame;

FIG. 6, shown on the same sheet as FIG. 4, is a sectional view of one of the frame legs taken along line VI—VI of FIG. 5; and FIG. 7, also shown on the same sheet as FIG. 4, is a pictorial elevation showing portions of the releasable latching mechanism for quick detachment and attachment of the frame and the tractor.

DESCRIPTION OF THE PREFERRED EMBODIMENTS

In the drawings, there is generally shown at 10 a loading device for quick attachment to and detachment from a tractor 11. The mounting apparatus is generally divided into a pair of spaced-apart subframes 12 secured to each rearward side of the tractor, a pair of spaced-apart subframes 13 secured to each forward side of the tractor and a main frame 14 for receiving the tractor and supporting the implement operating apparatus.

The subframes 12 comprise forwardly and rearwardly extending members 15 and 16 having plates 17 and 18 at the rearward ends thereof. A pair of plates 19 and 20 and a plurality of bolts 21, 22, 23 and 24 secure the members 15 and 16 to the rear axle 25 of the tractor between plates 17 and 19, 18 and 20. At the forward ends of members 15 and 16 are latching apparatus 27 and 28 for cooperable engagement with latching apparatus 42 and 43 of the main frame section 14. Also provided on either or both sides of the tractors in the area of latching apparatus is an L-shaped member 26 which forms a step for aiding an operator in mounting the tractor.

The subframes 13 comprise a baseplate 29 (and 34) having a bracket 30 extending laterally therefrom and mounting a slide 31 for engaging the cooperating underside and inward side of the elongate members 35 and 36 of the main frame 14. The baseplates 29 (and 34) are secured to the forward end of the tractor by a plurality of machine screws or bolts 32.

The main frame 14 comprises a pair of spaced-apart members 35 and 36 which are connected at their forward ends by a transverse member 37 and which have respective latching mechanisms 42 and 43 at the rear ends thereof. A pair of upright members 38 and 39 are rigidly secured at their lower ends to respective frame members 35 and 36 immediately forward of the latching mechanisms 42 and 43.

A pair of diagonally disposed members 40 and 41 connect the upper portions of the upstanding members 38 and 39 to approximately the midpoints of horizontal members 35 and 36 respectively to form a rigid frame construction.

The upstanding members 38 and 39 have hollow upper end portions 44 and 45 each of which includes a transverse pin 46 and 47 for extending through corresponding apertures 52 and 53 of ends 50 and 51 of elongate boom members 48 and 49 to pivotally connect the boom structure to the upper ends of members 38 and 39.

The digital ends 54 and 56 of the boom members 48 and 49 are pivotally connected to the bucket-type implement 58 by pins 67 and 68 which extend through aligned apertures 63, 55, 64 and 65, 57, 66 of plates 59 and 60 on one end of the bucket and plates 61 and 62 at the other end of the bucket 58.

Similarly, the bucket plates 59 and 60 and 61 and 62 include apertures 69 and 70 and 71 and 72 for receiving pins 75 and 76 to pivotally mount the ends of hydraulic units 73 and 74 to the bucket. The other ends of hydraulic units 73 and 74 are pivotally connected to the boom members 48 and 49 by means of pins 79 through apertures 77 and a like pin through apertures 78. With these pivotal connections, the bucket 58 may be pivoted at pivot points formed by pins 67 and 68 about an axis which is transverse of the tractor in order to perform the digging, scraping and dumping operations required of the bucket 58. A pair of hydraulic units 80 and 81 are disposed on either side of the frame and pivotally connected to the boom members 48 and 49 intermediate the ends thereof at apertures 82 and 83 by pin 84 and a similar pin. The other ends of the hydraulic units 80 and 81 are pivotally connected to the lower portions of the upstanding members 38 and 39 at a pair of tabs 85 and 88 on each one having respective apertures 86 and 89 therein for receiving respective pins 87 and 90. The hydraulic units 80 and 81 so connected may be operated to raise and lower the boom structure and, accordingly, the implement bucket 58 in a manner to aid the digging, scraping, lifting and dumping operations of the loader.

Attention is now directed specifically to FIGS. 3, 4, 5 and 6 for a moment, wherein there is provided a stand 96 comprising a pair of spaced-apart stand legs 97 and 98 which are pivotally connected to the spaced-apart leg members 35 and 36 of the main frame 14. Connecting the ground-engaging ends of legs 97 and 98 is a transverse member 99 which is the actual member for engagement with the ground or other supporting base. Each of the leg members 97 and 98 includes upper end members 100 and 101 respectively, secured thereto by respective roll pins 116 and 117. These end members 100 and 101 are pivotally connected to the respective leg members of the main frame 14 as shown particularly in FIG. 6.

In FIG. 6, leg member 35 is shown as being formed of a pair of cooperable sections 102 and 103 which form an elongate channel for receiving the corresponding stand leg end portion 100 which is pivotally connected by pin 107 to side journaling members 108 and 109. The frame 14 is supported on a tractor by the slides 31 on each side of the frame which supports the frame members 35, 36 with the legs 97, 98 disposed therein in a storage position. In FIGS. 5 and 6, pin 107 pivotally connects the leg 97 to the horizontal frame member 35 and a pin 110 pivotally connects the rod 112 to the end of stand leg member 100 to form a toggle mechanism which further includes a compression spring 115 carried on rod 112 between a rod and keeper 112' and a spring stop member 114 secured to rod 112. Further, as is illustrated a guide member 113 is secured to the frame and includes an aperture for receiving and guiding rod 112 as it moves backward and forward and in an arcuate path about the pivot point formed by pin 107. With the stand legs located in the storage position as shown in FIG. 5, the toggle mechanism is providing the restoring force of spring 115 clockwise about the pivot formed by pin 107 and as the stand legs are pivoted downwardly toward their ground-engaging position the longitudinal axis of pins 107 and 110 become parallel and together perpendicularly aligned with and in the same plane with the longitudinal axis of rod 112, whereby the restoring force of spring 115 is transferred from a clockwise direction to a counterclockwise direction about pin 107. Therefore, as the tractor exits the channel formed by side members 35 and 36 and slide devices 31 pass from the supporting relationship with the legs 97 and 98, and beneath and behind the pivot formed by pin 107, the stand drops due to the force of gravity and the restoring force of spring 115 aids the swing and forces the stand 96 past a vertical disposition into a rearwardly extending position for engaging the ground and providing a substantial support for the apparatus.

Located immediately to the rear of the pivot formed by pin 110 and secured to the horizontal member 35 is a leg stop "116" against which the leg member 100 bears when the stand is in its ground-engaging position. The member 100 is secured to leg 97 by means of a roll pin 116 which extends through aligned apertures in the tongue 105 of member 100 and the groove 106 in the upper end of leg 97.

The horizontal legs 35 and 36 of the main frame remain substantially horizontal in both of the mounted and unmounted conditions of the apparatus; however, the movement of the tractor relative the frame causes the downward extending portion 130a of the latch apparatus 42 to engage the front subframe slide 30 which pivots the entire structure to a slight extent on the ground-engaging portion 91 of the bucket 58 in order that stand 96 may be pivoted past a vertical position on both entry and exit of the tractor.

FIG. 7 particularly illustrates one form of coupling apparatus which may be employed in practicing the present invention. The coupling apparatus 27 of the subframe 12 includes a plate 127 which carries a transversely disposed pin 128, and latch apparatus 42 of the main frame includes a structure 129 having extending therefrom a V-shaped plate 130 having rearwardly extending tips 131 and 132 and edges 133 and 134 for guiding pin 128 into a U-shaped slot 135. Upon seating of pin 128 in slot 135, a fan-shaped latch plate 136, previously pivoted upwardly by pin 128, swings downwardly from its pivot 137 behind the pin 128 locking pin 128 into position. A pair of aligned apertures 139 in member 131 and plate 136 may receive a locking pin (not shown). To release the latch a rope, cable, rod or the like (not shown)

connected to plate 138, may be pulled to raise the fan-shaped plate 136 from interference with pin 128 and the tractor may be driven from the main frame 14. As the slides 31 of the subframes 13 move rearwardly relative the lower surface of the side members 35 and 36 support is removed from maintaining stand 96 in its storage position and as slides 31 reach the pivot point effected by pins 107, stand 96 begins to fall from its own weight. As previously explained, when the toggle elements reach a predetermined alignment, compression spring 115 forces the stand 96 beyond a vertical position at a time prior to complete exit of the tractor from the main frame so that upon such exit, the main frame is pivoted downward slightly about the engagement of bucket members 91 with the ground to engage transverse stand member 99 with the ground.

Prior to releasing the latches and exit of the tractor, the hydraulic rams are, of course, contracted to conceal their pistons from the elements and to place the bucket member 91 in engagement with the ground.

Upon complete exit of the tractor from the apparatus, the apparatus is self-supporting on bucket members 91 and the stand 96. To prevent an inadvertent bump from moving the apparatus sufficiently rearward to collapse stand 96, a chain 122, or other similar safety means, is connected between the rear of the main frame and the stand 96. In the particular embodiment illustrated, chain 122 is connected to the lower end of the upstanding member 38 and is releasably connected by means of an S-hook to hole 120 in the transverse stand member 99. A similar chain is provided on the other side of the apparatus.

To mount the apparatus on a tractor, the safety chains or cables are disengaged from the stand 96 and hooked out of the way by hooking the S-hook through the center link on the safety chain, then again hooking it to the first link from the attachment point on upright members 38 and 39. The tractor is then driven forward into the channel of the main frame 14 so that the slides 31 engage and slightly lift the main frame at its rear end. The slight lifting of the rear of the apparatus pivots the apparatus about bucket members 91 and permits stand 96 to achieve a vertical orientation. As the slides 31 move relative the members 35 and 36 they engage stand legs 97 and 98 pivoting the stand 96 forwardly and upwardly into its storage position. The pin 128 is latched in slot 135 and the slides 31 are received by the slots formed by the depending guides 118 and 119 and their respective frame members 35 and 36. At this time hydraulic connections may be made and the apparatus is placed in a working condition.

Although minor modifications might be suggested by those versed in the art, it should be understood that we wish to embody within the scope of the patent warranted herein all such modifications as reasonably and properly come within the scope of our contribution to the art.

The embodiments of the invention in which an exclusive property or privilege is claimed are defined as follows:

1. Self-supporting implement apparatus for detachable mounting to a tractor, comprising,
   a horizontal loader frame including means defining a channel for receiving a tractor and having means for releasably securing a tractor thereto,
   a boom pivotally connected to said frame for receiving an implement to be connected to said boom and including first means for engaging ground to support the apparatus,
   a stand connected to said loader frame and including second means for engaging the ground to support the apparatus free of a tractor in cooperation with said first supporting means with said frame remaining horizontal, and
   means carried by a tractor for pivoting said stand into a storage position upon entry of the tractor into said channel.

2. The apparatus according to claim 1, wherein said stand includes a pair of spaced-apart legs each of which is pivotally connected to said frame, and said second ground engaging means including a transverse member connecting said pair of spaced-apart legs.

3. The apparatus according to claim 1, comprising means for latching said stand in its ground-engaging position.

4. The apparatus according to claim 3, wherein said latching means includes chain means releasably connecting said stand and said frame.

5. The apparatus according to claim 1, comprising means for pivoting said stand past a position of vertical dependency upon exit of the tractor from said channel.

6. The apparatus according to claim 5, wherein said pivoting means comprises a toggle mechanism including a compression spring disposed against said stand, a spring stop disposed against said spring, and a rod supporting said spring and pivotally connected to said stand at a point different from the pivotal connection of said stand to said frame to direct the restoring energy of the spring in a direction to aid movement of said stand toward its ground-engaging position upon movement of said stand away from its storage position.

7. The apparatus according to claim 5, comprising stop means connected to said frame in the path of movement of said stand to define the ground-engaging position of said stand.

8. Implement-mounting apparatus for a tractor, comprising elongate boom means having forward and rearward ends,
   an implement operatively connected to the forward end of said elongate boom means,
   frame means for supporting said elongate boom means, said frame means including
      a horizontal U-shaped frame for receiving a tractor, and
      means for releasably securing said U-shaped frame to a tractor including
         frame-supporting means secured to the forward end of a tractor, and
      stand means pivotally connected to said U-shaped frame and operated by said tractor-mounted frame-supporting means upon movement of the tractor to pivot between a ground-engaging position and a storage position with said frame remaining in the horizontal position.

9. The apparatus according to claim 8, wherein said U-shaped frame comprises
   a pair of spaced-apart horizontal legs for receiving a tractor therebetween and which remain substantially horizontal in both mounted and unmounted conditions of said apparatus,
   wherein said stand means comprises
      a pair of stand legs pivotally connected to respective ones of said horizontal spaced-apart legs, said stand legs pivoting downwardly upon exit of a tractor from between said spaced-apart legs, and
      means forcing said stand legs upon downward pivoting thereof to swing said stand leg past a vertical position to its ground-engaging position,
   and wherein said stand stop means secured to said frame in the path of said stand legs for defining the ground-engaging position of said stand means.

10. The apparatus according to claim 9, comprising means operable to place said implement in a ground-engaging position, and lifting means depending from said horizontal legs, and wherein said frame-supporting means engages said lifting means to slightly pivot said apparatus about the ground-engaging pivot of said implement upon entry and exit of the tractor with said horizontal legs being only slightly pivotally moved about the last-mentioned pivot point.

11. The apparatus according to claim 8, wherein said U-shaped frame comprises
   a pair of spaced-apart legs for receiving a tractor therebetween, said spaced-apart legs disposed and remaining substantially horizontal in both the mounted and unmounted conditions of the apparatus,
   and said stand means comprises
      at least one stand leg pivotally connected to one of said horizontal spaced-apart legs, said stand leg pivoting downwardly upon exit of the tractor between said spaced-apart legs, a stand member carried at the free end of said stand leg for engaging the ground, and means connected to said stand leg for insuring overshoot of the vertical as said stand leg pivots downwardly so that said stand member engages the ground after the stand leg passes a vertical position and rearward of its pivot point.

12. The apparatus according to claim 11, wherein at least one of said horizontal spaced-apart legs comprises means forming a hollow compartment therein for receiving said stand leg in its storage position, and said overshoot means comprises energy storage means connected to said stand leg operable to store energy upon movement of said stand leg to its storage position and operable to release energy to said stand leg as it moves toward its ground-engaging position.

13. The apparatus according to claim 11, wherein said one stand leg is pivotally connected to said one horizontal spaced-apart leg intermediate its ends to provide a pair of stand leg sections, and said overshoot means comprises spring apparatus connected between said one horizontal spaced-apart leg and one of said stand leg sections, said spring apparatus including a spring flexed to store energy upon movement of said stand leg to a storage position and operated to release its stored energy upon movement of said stand leg toward its ground-engaging position.

14. The apparatus according to claim 11, wherein said stand leg is pivotally connected to said one horizontal spaced-apart leg intermediate the ends of said stand leg forming a pair of stand leg segments, and said overshoot means comprises spring stop means and a compression spring disposed between said spring stop means and said horizontal spaced-apart leg, said spring being compressed upon movement of said stand leg toward its storage position and operable to release the energy stored therein upon movement of said storage leg to its ground-engaging position.

15. The apparatus according to claim 14, wherein said spring stop means includes a rigid member pivotally connected to said one segment of said stand leg, said rigid member extending through said compression spring, and means secured to said one horizontal leg having an aperture therein receiving said rigid member, said rigid member being slidably received by said aperture to guide said compression spring.

16. The apparatus according to claim 11, wherein said overshoot means comprises means, including the pivoted connection of said stand leg to said one horizontal leg, forming a toggle which is effective to force said stand leg toward its ground-engaging position after a predetermined amount of movement out of its storage position.

17. The apparatus according to claim 16, wherein said means forming said toggle includes a rod mounted on said one horizontal leg for reciprocating and arcuate movement, said rod being pivotally connected to said stand leg, a spring stop secured to said rod, a compression spring disposed on said rod between said spring stop and said horizontal spaced-apart leg, said spring being compressed as said stand leg moves toward its storage position, the longitudinal axis of said stand leg, the pivot point of said stand leg relative said one horizontal leg, and the pivot point of said rod relative said stand leg being effective to direct the energy stored in said spring in one direction about the first-mentioned pivot point when said stand leg is in its storage position and in an opposite direction about the first-mentioned pivot point when said stand leg moves a predetermined amount away from its storage position.

UNITED STATES PATENT OFFICE
CERTIFICATE OF CORRECTION

Patent No. 3,612,311                      Dated October 12, 1971

Inventor(s) Hass S. Eidy, Edward M. Jankowski and Richard H. Mott

It is certified that error appears in the above-identified patent and that said Letters Patent are hereby corrected as shown below:

Col. 4, line 47, change "stop '116' " to --stop 116'--.

Col. 5, line 64, change "stand connected" to --stand pivotally connected--.

Col. 5, line 74, change "including" to --includes--.

Signed and sealed this 6th day of June 1972.

(SEAL)
Attest:

EDWARD M. FLETCHER, JR.          ROBERT GOTTSCHALK
Attesting Officer                 Commissioner of Patents